Sept. 1, 1970  J. O. BENNETT ET AL  3,526,276
FLUID SEPARATOR WITH DELAYED RESPONSE LIQUID
LEVEL CONTROL DEVICE
Filed Nov. 15, 1968
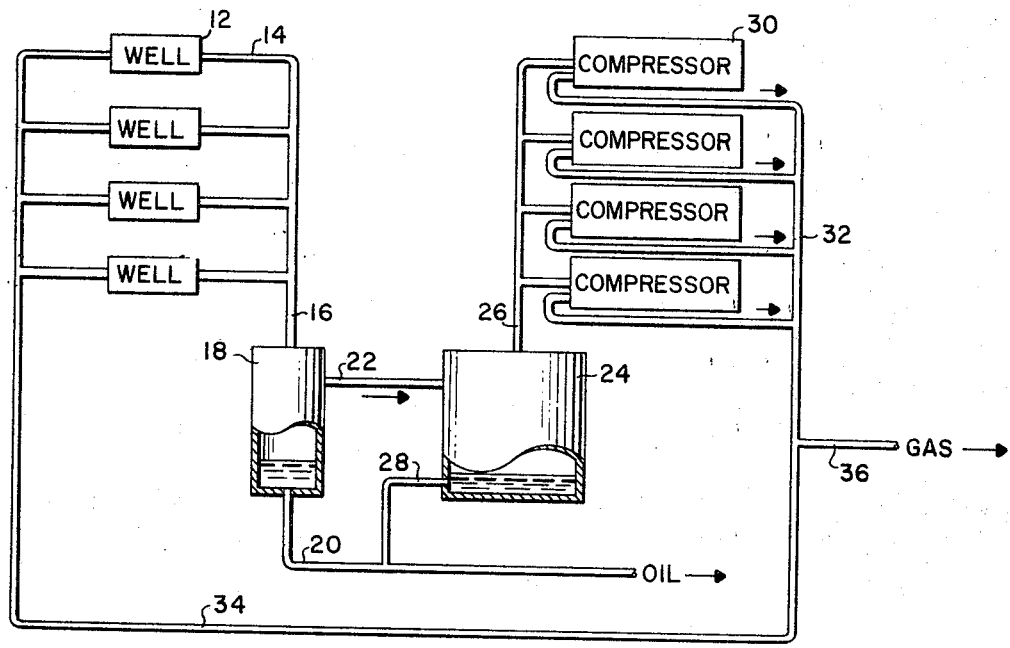
FIG. 1
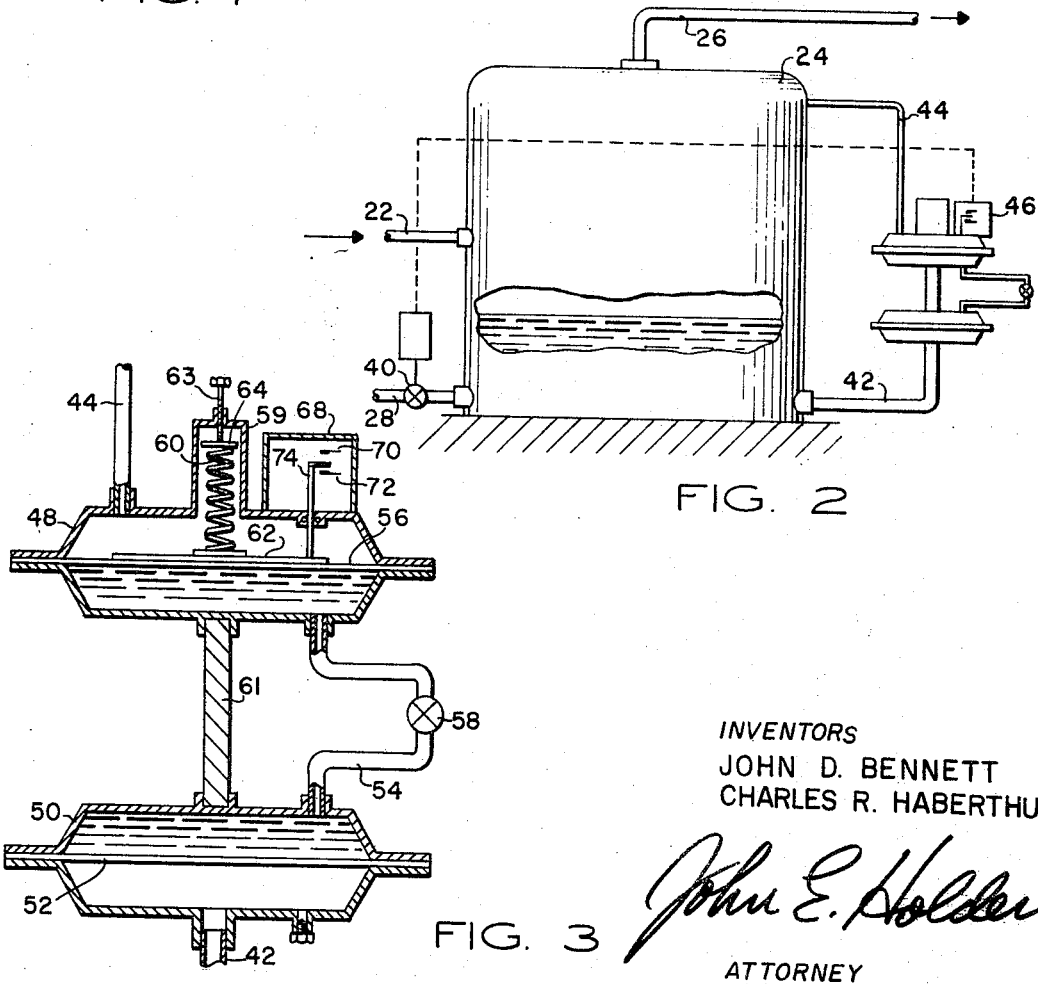
FIG. 2
FIG. 3
INVENTORS
JOHN D. BENNETT
CHARLES R. HABERTHUR
John E. Holder
ATTORNEY United States Patent Office 3,526,276
Patented Sept. 1, 1970

3,526,276
FLUID SEPARATOR WITH DELAYED RESPONSE
LIQUID LEVEL CONTROL DEVICE
John D. Bennett, Richardson, and Charles R. Haberthur,
Sweetwater, Tex., assignors to Sun Oil Company,
Philadelphia, Pa., a corporation of New Jersey
Filed Nov. 15, 1968, Ser. No. 776,106
Int. Cl. B01d 19/00; F04f 1/20; F16k 31/165
U.S. Cl. 166—52
7 Claims

ABSTRACT OF THE DISCLOSURE

A dampening device is used in a mechanism for controlling the liquid level in a tank. The tank comprises a portion of a fluid separation system. The liquid level in the tank often pulsates erratically in response to pressure fluctuations, vibrations, flashing, et cetera, in the separator system. The dampening of the control mechanism provides stability to the mechanism for opening a valve in the system to dump liquids therefrom. The tank may be a second stage separator for fluids produced from a plurality of wells. The gas output line of the second stage separator may be connected to compressors, from which the compressed gas may be used to gas lift fluids from the wells.

BACKGROUND OF THE INVENTION

This invention pertains to a fluid level control apparatus, and more particularly to an apparatus for controlling a dump valve from a liquid-gas separator in response to liquid level changes.

In many oil producing fields, gas gathering systems are used for transmitting gas from gas separators near producing wells or from the side outlets of well casing heads, to natural gasoline extraction plants, or to compressor plants. In the compressor plant, the gas is compressed for long distance transmission, or for re-injection into the wells. For this purpose, pipelines of appropriate size are used, designed to accommodate the volume gas to be moved at the desired pressure. Strategically situated inner communicating gas mains extend to different portions of a field, and smaller diameter laterals connect these with individual wells. In many instances, after compression and treatment for extraction of gasoline vapor, the resuting dry gas is transmitted by a separate distributing system to various gas lifts or injection wells, or to gas engines or boiler plants where it may be used for power development.

Design of the gas gathering system must be considered in its relation to the pressure conditions at the wells or separators, the pressure loss involved in accomplishing transmission of the gas to a point of utilization, and desirable pressure at such point. Often it will be necessary to compress the gas, either to accomplish its transmission through the gathering and distributing lines, or to endow it with the necessary pressure for its efficient use. If the gas produced at the wellhead or separator is too low in pressure to accomplish its transmission to the point of utilization in the field or to a compressor plant in the vicinity where it is compressed for long distance transmission, it will be necessary to install a booster plant in the field near the wells. The purpose of this is moderately to increase pressure to facilitate transmission through the gathering lines.

Compression of gas to high pressures for re-injecting into the wells for gas lift operations also requires the use of compressors. In such gas lift operations, a plurality of wells are supplied with gas from a single compressor station. It is desirable to have gas injected into the wells at a predetermined pressure, in order to effect the lifting operation, and therefore, controls are placed at each individual wellhead to pemit an injection or "kick" of gas into the well only upon the gas in the injection line being at such predetermined pressure. In addition, clock mechanisms are normally used with the injection controls to cyclically control the injection of gas into the well, and to permit sequential injection into the individual wellheads so that the pressure can be maintained at a desired pressure level. If the pressure level is not sufficiently high when the clock actuates the injection valve, an injection will not take place due to the minimum pressure control. In this event, the clock will move to the next sequence spot and again activate the gas kick, whereupon, if sufficient pressure in the line exists, gas will be injected into that well. However, because the kick takes place out of sequence, a second well may be activated as the same time, thus permitting more than one kick at the same instant. As a result, a greater than normal volume of fluids are ejected from the wells into the production gathering system. Normally, the separators which are utilized in the system for separating the liquid and gas constituents, are designed to take care of an amount of production resulting from one well being kicked at a time. Therefore, when more than one well kicks at the same time, the liquid in the separator builds up at a rate greater than the separator is designed to handle. The liquid then will not drain fast enough from the separator, and therefore becomes entrained in the gas line to the compressor.

In order to avoid this undesirable condition, it is common to include a surge tank between the separator and the compressor, or in the alternative, to provide a second stage or auxiliary separator between the first separator and the compressor.

The utilization of a surge tank in the gas return line provides an additional problem. Normally a battery of compressors are arranged in parallel to draw gas from the surge tank or separator for compressing and passage to the injection wells and to gas sales. If the compressors operate sequentially, that is, the intake strokes of the compressors are sequentially applied to the output line from the surge tank, a fairly steady suction is applied to the surge tank or auxiliary separator. However, if, as often happens, the compressors randomly stroke simultaneously to impart a greater thtan normal suction to the separator system, intermittent pressure surges are applied to the output of the surge tank or auxiliary separator. It is possible that pressure surges, under certain conditions, may even cause flashing of liquid to vapor in the tank. Also, vibrations from the compressors are transmitted via the suction line to the surge tank. In addition, rough operation of the pressure reducing regulator may occur in the system. These factors cause an erratic fluctuation of the liquid level in the tank.

Controls on the surge tank are activated in response to liquid level changes. When such rapid fluctuations in liquid level take place, the controls are ineffectual to follow the liquid level accurately. Heretofore, such liquid level controls have been constructed so that they are actuated in response to immediate changes in the liquid level. In such controls, liquid pressure operates on a diaphragm in the control mechanism to actuate a control switch or the like. However, such devices are immediately sensitive to liquid level changes, and as a result, when rapid fluctuations occur, perhaps only momentarily, a level change registers in the control mechanism which causes the mechanism to control a dump valve to drain or shut off a drain of liquid from the tank. If such fluctuations take place rapidly enough, the mechanism is continuously cycling and the liquid level control is ineffectual.

It is therefore an object of the present invention to provide a new and improved liquid level control device.

SUMMARY OF THE INVENTION

With this and other objects in view, the present invention contemplates a fluid storage system having means for controlling the liquid level in a vessel containing liquid and gaseous constituents. The system includes a dump valve on the vessel and a control mechanism for operating the valve. Means are provided for delaying the response of the control mechanism to changes of the liquid level in the vessel. The delay means is operatively positioned in the system between a liquid level determining means and the control mechanism. The delay means permits the control mechanism to operate only when a constant liquid level change is indicated over a period of time.

A complete understanding of this invention may be had by reference to the following detailed description, when read in conjunction with the accompanying drawings illustrating an embodiment thereof.

BRIEF DESCRIPTION OF THE DRAWINGS

FIG. 1 shows a schematic flow diagram for an oil field gas lift operation;

FIG. 2 is schematic view of a portion of a fluid separation system, including a liquid level control device incorporating principles of the present invention; and FIG. 3 is a detailed view of the liquid level control device.

DESCRIPTION OF THE PREFERRED EMBODIMENTS

FIG. 1 of the drawings shows a schematic view of a typical system for use in injecting gas into wells for lifting purposes and for producing liquid and gas constituents therefrom. The system includes a plurality of producing wells 12, with production lines 14 emanating therefrom and converging into a single gathering line 16 for carrying fluids produced from the wells. The gathering line 16 terminates in a liquid and gas separator 18 of any well known type which provides a means for separating the liquid and gas constituents of the producing fluids. A liquid output line 20 from the separator carries a liquid constituent of the fluid to a transporting means such as an oil pipeline 20 for conveying liquid products to a refinery or the like for processing. A second output line 22 from the separator carries gaseous constituents of the producing fluids to a second stage separator or surge tank 24. Gases leave the surge tank 24 through suction line 26 while the liquid constituents separated therein leave through line 28 to the liquid output or oil sales line 20. The suction line 26 carries gas from the second stage separator 24 to the compressors 30 which compress the gas and discharge it into a pressured gas line 32. The pressured gas is returned through a gas input line 34 for injection into the wells 12. A portion of the pressured gas may be diverted through a gas product line 36 for transmission to a gas sales point.

In the operation of the system described above, the gas being injected into the wells 12 produces a lifting effect therein to lift liquid petroleum constituents from the bottom of the wellbore to the surface. Control devices (not shown) are positioned at each wellhead site to facilitate a sequential operation of gas injection valves at each well. Such control devices are typically comprised of a timing mechanism and a pressure regulator. The pressure regulator may be set so that the gas injection valve will not operate unless the pressure of the gas to be injected is at a predetermined level. The injection of gas into the well lifts liquid products from the bottom of the wellbore to the surface and out through the flow lines 14 to a gathering line 16. The produced fluid is then fed to a liquid-gas separator. Liquid-gas separators utilize various means to knock out the liquid constituents of the produced fluid so that they may be drained therefrom for transportation to an oil sales point, such as a refinery. The gas constituents are then passed into a second stage separator or surge tank 24 where any remaining fluids are separated from the gas. The resulting dry gas is pulled into the compressors where the gas pressure is raised to a sufficient level for injection of the gas back into the wells or for transportation to a gas sales outlet such as a gasoline plant.

Various factors may affect the operation of such a system and thereby cause the operation to deviate from the normal routine described above. For example, in the injection of gas into the wells for lifting purposes, if the pressure at the wellhead is not at a predetermined level desirable for such gas lift operations, the gas lift injection valve will not open, and will remain closed until such pressure has built up to the desired level. In this event, the delayed injection or kick may be timed to coincide with the injection of gas into another of the wells to thus provide a simultaneous injection of gas into more than one well. In this event, a greater than normal amount of fluid constituents are produced from the wells at a single instant and enter the gathering lines 16 for transmission into the separator. The separator which is designed for a sequential production of the wells may become overloaded by such simultaneous kicks. In this event, the liquid constituents of the fluid may not be sufficiently removed in the separator, and as a result, the gas being passed on through the system may have considerable amount of liquid entrained therein. In this event, the surge tank 24 provides a secondary means for permitting liquid constituents to drop from the fluid.

Another problem which may exist in the operation of this system is that the compressors which are randomly operated may accidentally coincide in their suction strokes so that occasionally all compressors may produce a suction at one time on line 26. When this happens, the pressure in line 26 and surge tank 24 rapidly fluctuates and may even cause the liquid constituents which are being collected therein to flash into a vapor phase. The dump valve on the separator is controlled by a liquid level determining mechanism which causes the dump valve to operate in response to the raising of the liquid level to a predetermined height. However, when liquid level fluctuations occur in the constituents particularly if such fluctuations are rapidly cycling, the mechanism reponsive to liquid level changes is operated so rapidly as to be ineffectual in determining the liquid level and for dumping liquid constituents from the separator. It is in this respect that the apparatus set forth in FIGS. 2 and 3 is constructed to provide a more adequate control under such operating conditions.

Referring now to FIG. 2 of the drawings, the surge tank 24 is shown having a wet gas input line 22 and a compressor suction line 26 extending upwardly from the upward end of the tank. At the bottom of the tank a liquid output line 28 permits the drainage of liquids from the tank, which drainage is controlled by a motor valve 40 in output line 28. A liquid level control mechanism is connected to the system by means of a liquid level sampling line 42 which permits the entry of fluids from the tank into the control device. An equalizing line 44 extends from the upper end of the control mechanism into the top of the surge tank. A dump switch 46 is actuated by the control mechanism for providing a control signal to the motor valve 40. A typical liquid level control used heretofore in such operations is represented by a broken line surrounding the upper portion of the control mechanism shown in FIG. 2. The additional portion of the system which is described in greater detail with respect to FIG. 3 provides for the improved control of the system under conditions set forth above.

Referring next to FIG. 3, details of the control device are shown. The device includes upper and lower housings defining chambers 48 and 50 respectively. Liquid from the surge tank is communicated with the lower chamber by means of a line 42 so that liquid is permitted to fill the lower half of the chamber 50 which is divided from the upper half of the chamber by means of a diaphragm 52. The upper half of the chamber 50 is communicated by means of a control line 54, with the lower half of the chamber 48. The chamber 48 is also divided by diaphragm 56. The upper half of the chamber 48 above the diaphragm is is communicated with the upper end of the surge tank 24 by means of the equalizing line 44 so that the gas pressure within the surge tank is imparted to the top of the diaphragm 56. The control line 54 connecting the top of the lower chamber with the bottom of the upper chamber includes an adjustable orifice 58 for regulating the flow of fluids through the control line. A mechanical support member 61 provides a means for mounting the two chambers relative to one another. An upwardly extending enclosure 59 on the chamber 48 provides a means for housing a regulator to control back pressure on the diaphragm 56 in the upper chamber 48. The regulator includes a spring 60 received within the enclosure 59, and a follower plate 62 positioned between the lower end of the spring and the diaphragm. An adjustable screw extends through the upper end of the enclosure 59, and has a shoulder 64 at its lower end. Rotation of the screw provides a means for changing the compression of the spring 60.

The dump switch 46, which controls the motor valve 40, includes within a housing 68, upper and lower contacts 70 and 72 respectively. A switch actuator 74 has an upper contact portion and a lower portion extending downwardly through the top of a housing 48 into engagement with the follower plate 62 on the diaphragm 56. Therefore, movement of the diaphragm causes the switch actuator 74 to move up and down for contacting the upper and lower switch contacts 70 and 72 respectively. A portion of the control mechanism described above forms a buffer system which is comprised of the lower portion of tthe upper chamber and the upper portion of the lower chamber, together with the connecting control line 54 and control orifice 58. A fluid, such as oil, is placed in the portion of the mechanism forming the buffer system.

In order to demonstrate the utility of the above described system, a brief description of a prior art control device is given. Such a device was comprised of a mechanism similar to the upper chamber 48 and associated mechanism of the present apparatus as shown in FIG. 3. In such a device, liquid from the tank was communicated with the lower portion of the chamber 48, so that as the liquid level in the tank rose, the diaphragm would move upwardly to move the switch actuator 74 into contact with upper contact 70 which in turn would cause the motor valve 40 to operate and open the drain line 28. It is seen that a rapid lowering of the liquid within the surge tank 24 would cause a decrease in the pressure of liquid acting on the lower portion of the chamber 48 which in turn would move the switch actuator 74 downwardly to the lower contact 72 and cause the motor valve to close. If the level then raises quickly, the valve is closed and additional liquid will have entered the tank through input line 22. Therefore, if the level changes were to take place rapidly, the motor valve would not be able to operate in such a rapid fashion as to follow the fluctuations of the diaphragm actuated switch. Thus the control of the valve would become ineffectual with respect to the amount of liquid contained in the surge tank. This in turn permits the liquid in surge tank 24 to raise to a level wherein some liquid may become entrained in the gas moving into the compressor suction line.

The present invention provides an apparatus to overcome this control problem. In the operation of the apparatus shown in FIG. 3, the liquid level of the surge tank 24 is communicated by means of line 42 with the lower side of the diaphragm 52 in lower chamber 50. For example, if the liquid level in the surge tank lowers suddenly, the pressure is decreased on the lower side of the diaphragm 52 in lower chamber 50, thus permitting the diaphragm to move downwardly. However, such downward movement of the diaphragm is not transmitted directly to the switch actuator 74 but instead, the oil which fills the lower portion of the upper chamber 48 is permitted to drain downwardly into the upper portion of the lower chamber 50 through the adjustable orifice 58 and control line 54. Thus the switch actuator 74 does not function in response to pressure differences or liquid level changes until the buffer system has a chance to communicate the variations in pressure to the diaphragm 56. Since the controllable orifice 58 may be regulated to control the sensitivity of the operation, the effect of rapid level changes within the pressure vessel may be dampened to the extent that the dump switch 46 does not operate except in response to prolonged liquid level changes within the surge tank 24.

The controllable orifice 58 may be in the form of a needle valve in combination with a check valve to give a fast flow in one direction, and a slow flow in the other direction. This would permit an increase in liquid level to be rapidly transmitted to the switch actuator 74 if, for example, the controllable orifice permitted the rapid upward flow of oil from the upper portion of lower chamber 50 to the lower portion of upper chamber 48, but permitted a slow flow in the opposite direction, which would allow the buffer system to control when the liquid level changed suddenly and then returned to the initial state.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In a well production fluid gathering system, a plurality of wells, each having means for gas lifting well fluids therefrom; means including a vessel for separating liquid and gaseous constituents of said well fluids and having separate flow paths for said gas and liquid constituents; means for compressing at least a portion of said gaseous constituents and for passing such compressed gas into said wells for operating said gas lifting means; control means to changes of liquid level in said separator constituents in said separator means, said control means including a mechanism for delaying the response of said control means to changes of liquid level in said separator means, said delay mechanism includes first and second chambers each having a diaphragm positioned therein dividing said chambers, means providing closed fluid communication between one side of each of said diaphragms in said first and second chambers; means for providing fluid communication between the other side of said diaphragm in said first chamber and a point below the normal liquid level of said separator means; and means connected to said diaphragm in said second chamber for operating said control means.

2. The apparatus of claim 1 and further including means for providing fluid communication between the other side of said diaphragm in said second chamber and a point above the normal liquid level of said separator means.

3. The apparatus of claim 1 and further including flow restriction means in said means providing fluid communication between one side of each of said diaphragms.

4. In a flow control apparatus responsive to fluid pressure changes, a fluid separator vessel, said vessel having a valve for controlling fluid communication with said vessel, an operator for said valve, and a switch for activating said valve operator, the combination of means for controlling said switch, which means comprises first and second chambers each having a diaphragm dividing said chambers into separate portions; a passageway for providing fluid communication between one of the portions of each of said first and second chambers; fluid flow restricting means in said passageway; means providing fluid communication between the lower end of said vessel and the other portion of said first chamber; and means responsive to differential pressure between the chamber portions of said second chamber for operating said switch so that said valve opens and closes depending upon the relative differential pressure in said second chamber portions.

5. The apparatus of claim 4 wherein said passageway and said one of the portions of each of said first and second chambers is filled with a liquid.

6. The apparatus of claim 5 and further including means providing fluid communication between the other portion of said second chamber and the upper end of said vessel.

7. The apparatus of claim 6 wherein said diaphragm in said second chamber moves to control the operation of said switch and further includes adjustable means for regulating the movement of said diaphragm in said second chamber.

References Cited

UNITED STATES PATENTS

| | | | |
|---|---|---|---|
| 1,907,025 | 5/1933 | Williams | 137—188 X |
| 2,580,433 | 1/1952 | Kain | 251—54 X |
| 2,736,337 | 2/1956 | Parks et al. | 137—395 X |
| 2,881,799 | 4/1959 | Menewisch | 251—54 X |
| 2,942,838 | 6/1960 | Peters | 251—54 |
| 3,260,308 | 7/1966 | Cryer | 166—267 |
| 3,406,682 | 10/1968 | Engstrom | 251—54 X |

JAMES A. LEPPINK, Primary Examiner

I. A. CALVERT, Assistant Examiner

U.S. Cl. X.R.

55—163; 137—188, 395; 166—53, 267; 251—54